United States Patent [19]

Jenny

[11] Patent Number: 5,744,414

[45] Date of Patent: Apr. 28, 1998

[54] PROCESS FOR PREPARING AN OLEFIN POLYMERISATION CATALYST

[75] Inventor: Charles Jenny, Lavera, France

[73] Assignee: BP Chemicals Limited, United Kingdom

[21] Appl. No.: 267,464

[22] Filed: Jun. 28, 1994

[30] Foreign Application Priority Data

Jul. 13, 1993 [FR] France .................... 93 08915

[51] Int. Cl.$^6$ .................................................... B01J 31/00
[52] U.S. Cl. ...................... 502/103; 502/102; 502/108; 502/109; 502/112; 502/115; 502/116; 502/118
[58] Field of Search ................................ 502/108, 109, 502/112, 115, 116, 118, 102, 103

[56] References Cited

U.S. PATENT DOCUMENTS

| | | | |
|---|---|---|---|
| 4,123,386 | 10/1978 | Avaro et al. .......................... | 502/108 |
| 4,302,567 | 11/1981 | Bahadir et al. ....................... | 502/109 |
| 4,387,201 | 6/1983 | Bahadir et al. ....................... | 502/109 |
| 4,442,225 | 4/1984 | Takitani et al. ....................... | 502/112 |

FOREIGN PATENT DOCUMENTS 0002522  6/1979  European Pat. Off. .

*Primary Examiner*—Elizabeth D. Wood
*Attorney, Agent, or Firm*—Brooks Haidt Haffner & Delahunty

[57] ABSTRACT

The present invention relates to a process for the preparation of a solid catalytic component of a catalyst of Ziegler-Natta type, comprising contacting (i) at least one compound (A) of a transition metal (TM) with (ii) a solid product (B) comprising a magnesium compound and having a reducing power for the transition metal (TM), in the presence of (iii) at least one olefin under conditions such that the olefin at least partially polymerizes during the contacting. The solid catalytic component is particularly useful for producing ethylene (co-)polymers in a gas phase process and for improving the statistical distribution of the comonomer in the copolymer structure.

14 Claims, No Drawings

PROCESS FOR PREPARING AN OLEFIN POLYMERISATION CATALYST

The present invention relates to a process for the preparation of a catalyst of Ziegler-Natta type, and to a process for the (co)polymerization of olefins using the catalyst.

It is known that a catalyst of Ziegler-Natta type is composed of a solid catalytic component containing a compound of a transition metal, such as titanium or vanadium, and generally a magnesium compound, and a cocatalytic component based on an organometallic compound of a metal belonging to Groups I to III of the Periodic Classification of the Elements.

It is also known to use such a catalyst in a process for the (co)polymerization of olefins, in particular for the copolymerization of ethylene with at least one other olefin containing at least three carbon atoms, in suspension in a liquid hydrocarbon or in the gaseous phase, at a temperature less than the melting point of the (co)polymer. The copolymer generally has a macromolecular structure in which the comonomer unit is distributed with relatively low homogeneity or not in a very statistical fashion. It results therefrom that, for a given density and a given weight-average molecular mass, the copolymer has both a relatively high comonomer content and a relatively high melting point. A distribution of relatively low homogeneity of the comonomer unit also has the effect of weakening certain mechanical properties of the films prepared from such a copolymer and of increasing the levels of solubles, for example in boiling n-hexane.

In European Patent Application EP-A-0,099,774, there is proposed a post-treatment of the solid catalytic component containing a transition metal and a magnesium compound using an olefin such as ethylene. In this case, the olefin is not used during the preparation of the solid catalytic component.

U.S. Pat. No. 4,442,225 discloses a method for preparing a solid catalytic component of a Ziegler-type catalyst comprising reacting (i) an organomagnesium compound or a mixture of an organomagnesium compound and an organoaluminium compound or their reaction product with (ii) a mixture of a halogenating agent and a titanium compound, in the presence of (iii) an electron-donor compound and (iv) an alpha-olefin. However, the organomagnesium compound or the mixture or the reaction product is used in state of solution for preparing a solid catalytic component of highly uniform particle diameter, of good fluidity, not readily disintegrating, suitable for olefin polymerization having a high degree of polymerizing activity, high stereospecific polymer productivity and high bulk density.

European Patent Application EP-A-0,002,522 discloses a process for polymerizing butene-1 with a solid catalyst comprising a milled admixture of titanium halide, Lewis base, anhydrous magnesium or manganous chloride and an unsaturated additive e.g., olefin. However, the magnesium compound has no reducing power for the titanium halide. The solid catalyst is suitable for increasing the productivity of butene-1 polymerization at lower polymerization temperatures, rather than higher temperatures.

The subject of the invention is thus the preparation of a catalyst of Ziegler-Natta type with a high activity in the polymerization of olefins, in particular a solid catalytic component based on a transition metal compound and on a magnesium compound, capable of manufacturing, in particular in suspension or in the gaseous phase, a copolymer of ethylene with at least one other olefin in which the (co-) monomer unit is distributed in a particularly homogeneous or statistical way in the macromolecular structure.

Another subject of the invention is the preparation of a catalyst of Ziegler-Natta type capable of manufacturing, in suspension or in the gaseous phase, a copolymer of ethylene with at least one other olefin having a relatively low melting point and a relatively low comonomer content for properties, such as density and weight-average molecular mass, which are moreover unchanged.

Another subject of the invention is the preparation of a catalyst of Ziegler-Natta type capable of manufacturing, in suspension or in the gaseous phase, a copolymer of ethylene with at least one other olefin having improved properties, especially when the copolymer is converted into a film, properties such as tear resistance and impact strength, and a low degree of solubles in boiling n-hexane.

Another subject of the invention is a process for the copolymerization, in suspension or in the gaseous phase, of ethylene with at least one other olefin using a catalyst of Ziegler-Natta type capable of producing copolymers with advantageous properties such as those mentioned above.

The subject of the invention is, first of all, a process for the preparation of a solid catalytic component of a catalyst of Ziegler-Natta type containing at least one transition metal, one magnesium compound and one halogen, and suited to the (co)polymerization of olefins, in particular the copolymerization of ethylene with at least one other olefin, which process is characterized in that it comprises bringing into contact:

(i) at least one compound (A) of a transition metal (TM) belonging to Groups IV, V or VI of the Periodic Classification of the Elements, with (ii) a solid product (B) comprising a magnesium compound and having a reducing power for the transition metal (TM), (iii) in the presence of at least one olefin under conditions such that the olefin at least partially polymerizes during the bringing into contact.

Unlike the post-treatments of the Ziegler-Natta catalysts carried out using an olefin and generally known under the term of "prepolymerization", post-treatments in which the olefin is brought into contact with the preformed solid catalytic component, the olefin is used in the present invention during the preparation of the solid catalytic component, that is to say before the stage known under the term of "prepolymerization". It was surprisingly found that when the solid catalytic component of a Ziegler-Natta catalyst is prepared under an olefin atmosphere under conditions such that at least part of the latter polymerizes during this preparation, the ethylene copolymers obtained using this component have a distribution of the comonomer units which is much more homogeneous and statistical. Thus, it was discovered that it was possible to improve the quality of the ethylene copolymers very notably if, during the preparation of the solid catalytic component, the catalytic sites based on a transition metal are simultaneously fixed to the solid component and activated by an olefin which at least partially polymerizes under the conditions of the preparation.

The process of the invention comprises a bringing into contact which can be carried out in an inert medium for the preparation e.g., a liquid or gaseous inert medium, substantially free of poisons, such as water, known to inhibit the activity of a Ziegler-Natta catalyst in an olefin polymerization. The gaseous medium can be a gas which is inert with respect to the constituents of the solid catalytic component, for example nitrogen, or light alkanes which are gaseous under the conditions of the preparation of the solid catalytic component, containing, for example, from 1 to 4 carbon atoms, in particular methane, ethane or propane. Bringing into contact in a gaseous medium can be carried out in a mechanically stirred dry reactor and/or a fluidized bed reactor in which the gaseous medium can also act as fluidization gas.

However, it is preferable to bring the components together in an inert medium for the preparation which is in particular liquid under the conditions of the preparation of the solid catalytic component. The liquid medium is substantially free of any poison, such as water, known to inhibit the activity of a Ziegler-Natta catalyst in an olefin polymerization. The liquid medium can be a liquid which is substantially inert with respect to the constituents of the solid catalytic component, in particular liquid hydrocarbons such as alkanes or cycloalkanes containing, for example, from 4 to 10 carbon atoms, in particular n-pentane, isopentane, n-hexane, n-heptane, n-octane or mixtures of these alkanes. The bringing into contact in a liquid medium can be carried out in a reactor preferably equipped with a mechanical stirrer system and with a double jacket for heating or cooling the liquid medium.

The process uses at least one compound (A) of a transition metal (TM) which can be chosen from easily-reducible transition metals, preferably titanium, vanadium or chromium. The transition metal (TM) can be used at its maximum valency or even at a valency immediately below this provided that the metal can be further reduced to a lower valency. However, it is preferable to use the transition metal at its maximum valency. The transition metal (TM) can be, for example, a tetravalent titanium or a trivalent titanium, a pentavalent or tetravalent vanadium belonging to a vanadyl group, a tetravalent or even trivalent vanadium, or a hexavalent chromium.

The compound (A) of the transition metal can be used in the form of a liquid under the conditions of the preparation, a liquid which can preferably be miscible or soluble in the liquid medium for the bringing into contact. The compound (A) can also be used in the form of a solid provided that it is soluble in the liquid medium for the bringing into contact. It can also be used in the form of a gas under the conditions of the preparation, especially when the bringing into contact is carried out in a gaseous medium or a liquid medium, it being possible for this gas to be dissolved or soluble in the liquid medium.

The compound (A) is generally chosen from the compounds of formula $Me(OR)_nX_{m-n}$ in which Me is vanadium, chromium or more particularly titanium, X is bromine, iodine and more particularly chlorine, R is a $C_1$ to $C_{14}$ aromatic, cycloalkyl or alkyl radical, or the group COR' with R' a $C_1$ to $C_{14}$ aromatic, cycloalkyl or alkyl radical, "m" corresponds to the valency of the transition metal and "n" is an integer or fractional number less than or equal to "m".

The compound (A) particularly recommended is chosen from the titanium compounds of formula $Ti(OR)_xCl_{4-x}$, in which R has the same definition as above and x is an integer or fractional number ranging from 0 to 4, preferably from 0 to 3 and in particular from 1.5 to 2.5. The compound (A) is preferably titanium tetrachloride, titanium dichloride dipropylate, titanium dichloride dicresylate or titanium dibutylate dichloride.

The compound (A) can be used pure or in solution in a solvent, such as an alkane.

The process also uses a solid product (B) comprising a magnesium compound and having a reducing power for the transition metal (TM). The solid product (B) must in fact be solid under the conditions of the preparation e.g., in the liquid or gaseous medium for the bringing into contact. It can comprise a solid organic support, such as a polyolefin, for example a polyethylene or a copolymer of ethylene, or preferably a solid inorganic support, in particular a porous refractory oxide, such as a silica, an alumina, or a mixture of these oxides, or also a solid magnesium compound, for example a magnesium oxide, hydroxide, chloride or hydroxychloride.

The solid product (B) contains a magnesium compound which can be liquid or solid under the conditions of the preparation. The magnesium compound can be chemically or physically fixed or deposited on a solid support, as described above. The magnesium compound can be separate or mixed with the solid support described previously. The solid product (B) can, for example, consist essentially of a solid magnesium compound which, in this case, at the same time acts as solid support. The magnesium compound can, in particular, be chosen from the compounds of formula $MgR_nX_{2-n}$ in which X is bromine, iodine and more particularly chlorine, R is a $C_1$ to $C_{14}$, preferably $C_2$ to $C_{12}$, aromatic, cycloalkyl or alkyl radical, or a group OR' with R' being a $C_1$ to $C_{12}$ aromatic, cycloalkyl or alkyl radical, and "n" is an integer or fractional number ranging from 0 to 2. In particular, the magnesium compound can be a magnesium dichloride, a Grignard reagent of formula MgRX in which R and X have the same definitions as above, or a dialkylmagnesium of formula MgR'R" in which R' and R", being different or identical, represent $C_1$ to $C_{14}$, preferably $C_2$ to $C_{12}$, aromatic, cycloalkyl or alkyl radicals. The magnesium compound can also be magnesium metal. The magnesium compound can be complexed with at least one electron-donor compound (ED), chosen from alcohols, phenols, ethers, thioethers, sulphones, sulphoxides, amines, amides, esters, phosphines, phosphoramides, aldehydes, ketones, trialkyl orthoacetates and silicon compounds with, in particular, Si—O—C bonds.

The solid product (B) moreover has a reducing power for the transition metal (TM), e.g., comprises a compound which reduces the transition metal (TM). The reducing compound can be separate or mixed with the solid support and/or with the magnesium compound described previously. It can be chemically or physically fixed or deposited on the solid product (B), in particular on a solid support or a solid magnesium compound such as those described previously. The solid product (B) can be in particular a composition composed essentially of a refractory oxide support, a magnesium compound and a reducing compound, or else a composition composed essentially of a solid magnesium compound and a reducing compound, or also a composition composed essentially of a solid reducing magnesium compound. The reducing compound can be liquid, gaseous or solid under the conditions of the preparation, provided that it forms an integral part of the solid product (B) e.g., in the form of a liquid absorbed in the solid product (B). The reducing compound can be of the same nature as the cocatalytic component, but is separate from the latter. It can, in particular, be chosen from organometallic compounds of metals of Groups I to III of the Periodic Classification of the Elements, preferably from alkylaluminiums, alkylmagnesiums, alkylzincs and alkylborons. The alkylaluminiums can be chosen from the compounds of formula $AlR_nX_{3-n}$ in which X is a group OR' with R' being a $C_1$ to $C_{12}$ aromatic, cycloalkyl or alkyl radical, or a halogen such as bromine, iodine or chlorine, or also hydrogen, R is a $C_1$ to $C_{12}$ aromatic, cycloalkyl or alkyl radical and "n" is an integer or fractional number ranging from 1 to 3, preferably from 1.5 to 3. The alkylmagnesiums can be chosen from the compounds of formula $MgR_mX_{2-m}$ in which X is a halogen such as bromine, iodine or chlorine, hydrogen, or a group OR' with R' being a $C_1$ to $C_{12}$ aromatic, cycloalkyl or alkyl radical, R is a $C_1$ to $C_{12}$ aromatic, cycloalkyl or alkyl radical and "m" is an integer or fractional number ranging from 1 to 2. Among the alkylzincs and alkylborons, it is possible to use diethylzinc or triethylboron. The reducing compound is preferably a trialkylaluminium of formula AlR'R"R'" in which R', R" and R'", being identical or different, represent $C_1$ to $C_{14}$, preferably $C_1$ to $C_8$, aromatic, cycloalkyl or alkyl radicals, a dialkylmagnesium of formula MgR'R" or a Grignard reagent of formula MgRX, the definitions of which have been given previously. Trimethylaluminium, triethylaluminium, triisobutylaluminium, diethylaluminium chloride, diisobutylaluminium hydride and n-butylmagnesium chloride are particularly preferred.

The solid product (B) which it is preferred to use in the invention can be a composition (I) consisting essentially of magnesium dichloride, of at least one electron donor compound (ED) such as that described previously and of an alkylaluminium having in particular the formula $AlR_nX_{3-n}$ given previously. The composition (I) can, for example, have the general formula:

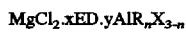

$$MgCl_2.xED.yAlR_nX_{3-n} \qquad (I)$$

in which "x" is a number ranging from 0.005 to 0.5, preferably from 0.01 to 0.2, and "y" is a number ranging from 0.005 to 1, preferably from 0.01 to 0.5.

There also exists another preferred solid product (B) which is a composition (II) consisting essentially of a porous refractory oxide, for example a silica, and of the preceding composition (I), in proportions such that the amount of magnesium in the composition (I) varies from 0.1 to 10 millimoles, preferably from 0.5 to 5 millimoles per gram of refractory oxide.

Another preferred solid product (B) is also known which is a composition (III) consisting essentially of magnesium metal and of an alkylmagnesium halide, the composition having the general formula:

$$Mg.xMgR_pX_{2-p} \qquad (III)$$

in which R is a $C_1$ to $C_{14}$, preferably $C_2$ to $C_{12}$, aromatic, cycloalkyl or alkyl radical, X is a halogen such as bromine, iodine or more particularly chlorine, "p" is a number ranging from 0.01 to 100, preferably 0.05 to 50, and "x" is a number ranging from 0.001 to 1.00, preferably from 0.01 to 1.00.

The solid product (B) is preferably substantially free of transition metal compound, that is to say that it does not contain transition metal compound of the type of compound (A), or that the amount is so low that it represents less than 2 mol % of transition metal with respect to the magnesium of the solid product (B). Moreover, according to the invention, the compound (A) must be brought into contact with the solid product (B) in the presence of an olefin which is preferably added to the medium for the bringing into contact e.g., a liquid or gaseous medium, under conditions such that the olefin at least partially polymerizes during the bringing into contact. The olefin can be one or more olefins, for example from $C_2$ to $C_{12}$, preferably from $C_2$ to $C_8$, in particular ethylene alone or as a mixture with at least one other olefin, for example from $C_3$ to $C_{12}$, preferably from $C_3$ to $C_8$, such that the other olefin(s) does (do) not represent more than 10 mol %, preferably not more than 5 mol %, of all the olefins polymerized during the bringing into contact. The olefin is present in the medium for the bringing into contact, in particular from the beginning of the bringing of the compound (A) into contact with the solid product (B).

The amount of olefin used can be very variable and does not constitute a factor which can affect the advantages sought for in particular on the (co)polymers manufactured. The amount of olefin can be extremely low and also cannot exceed an excessive amount from the viewpoint of economic interest. It can be, for example, such that the solid catalytic component prepared according to the invention contains, per millimole of transition metal (TM), from 0.01 to 100 g, preferably from 0.1 to 50 g, more particularly from 0.5 to 30 g, of polymerized olefin during the bringing into contact.

In practice, the preparation of the solid catalytic component can be carried out according to a large number of variants. The preparation consists essentially of mixing the compound (A) and the solid product (B) in the presence of olefin, for example in an inert liquid or gaseous medium as described previously. The mixing can in particular be carried out by adding the compound (A) and the solid product (B) simultaneously to the inert medium for the preparation. It is also possible to add the solid product (B) to the compound (A) mixed beforehand with the inert medium for the preparation. However, it is preferable to add the compound (A) to the solid product (B), for example suspended beforehand in the inert medium for the preparation. The olefin is preferably present from the beginning of the addition of the compound (A). The compound (A) can be added quickly, for example in less than one minute, or slowly so that its addition lasts from 1 minute to 10 hours, preferably from 10 minutes to 5 hours. The mixing is preferably carried out with stirring.

In all cases, whatever the method adopted for mixing the compound (A) with the solid product (B), the olefin is added to the medium for the preparation and is preferably present as soon as the compound (A) is brought into contact with the solid product (B). Thus, the olefin can be used at the time when the compound (A) and the solid product (B) are mixed, for example either by rapid addition of the olefin from the beginning of the mixing or preferably by slow continuous addition of the olefin, during at least all the time during which one of the constituents of the mixture is added to the other. The addition can obviously be continued beyond the time for carrying out the bringing into contact or the mixing, that is to say beyond the end of the addition of the constituent(s) of the mixture.

Bringing the compound (A) into contact with the solid product (B) in the presence of the olefin does not exclude the simultaneous or succesive use of one or more other compounds. In particular, an alkylating agent such as an alkyl or phenyl halide can be used simultaneously with the compound (A) and the solid product (B) under an olefin atmosphere, in particular in the event of forming a compound having a reducing power for the transition metal (TM) contained in the solid product (B). Thus, when the solid product (B) consists essentially of magnesium metal, the alkylating agent, such as an alkyl or phenyl chloride, can be added to form a Grignard reagent, that is to say an agent which reduces the transition metal (TM). The addition of the alkylating agent can be very rapid or slow so that its addition can be from 1 minute to 10 hours, preferably from 10 minutes to 5 hours. Other compounds can also be used, such as halogenating agents, in particular silicon halides such as $SiCl_4$, aluminium halides such as $AlCl_3$ or alkylaluminium chlorides, alkyl or phenyl chlorides, such as carbon tetrachloride, chloroform, n-butyl, sec-butyl or tert-butyl chlorides, or benzoyl chloride, or also electron-donor compounds such as those mentioned previously.

The olefin is preferably used under conditions such that it immediately polymerizes when the compound (A) comes into contact with the solid product (B). It preferably polymerizes throughout the entire period in which the compound (A) is brought into contact with the solid product (B), for example throughout the whole period in which one of the two constituents is added to the other. It can also polymerize beyond this period, without the advantageous properties of the (co)polymers being substantially affected. Various conditions can be applied so that the polymerization of the olefin takes place during the bringing into contact of the compound (A) with the solid product (B). Thus, for example, the temperature of the bringing into contact is sufficient for the polymerization reaction of the olefin to start and be carried out, even at a slow rate. The temperature can, for example, range from 0° to 120° C., preferably from 10° to 100° C., in particular from 30° to 90° C. When the olefin is gaseous under the conditions of the bringing into contact, its pressure can also be sufficient for the polymerization of the olefin to start and be carried out, even at a low rate. The pressure of the olefin can be, for example, from 1 to $10^3$ kPa, preferably from 10 to 500 kPa. The polymerization of the olefin can also depend on the amount of the compound having a reducing power present in the solid product (B) at the time of the bringing into contact with the compound (A). Thus, the rate of polymerization of the olefin can depend not only on the nature of the reducing compound but also on the amount of the latter in particular with respect to the compound (A). The amount of reducing compound can be, for example, such that the molar ratio of the reducing compound to the compound (A) is from 0.025 to 1, preferably from 0.25 to 0.5.

It was surprisingly found that when hydrogen is used with the olefin at the time of the bringing into contact of the compound (A) with the solid product (B), the solid catalytic component has an improved morphology and in particular a narrower particle size distribution, with in particular a greatly reduced content of large particles. Hydrogen can, for example, be used in an amount such that the ratio of the hydrogen partial pressure to that of the olefin in the medium of the preparation ranges from 0.03 to 5, preferably from 0.1 to 1.

The solid catalytic component has a morphology which can depend essentially on that of the solid product (B). The latter can have any morphology, but preferably a regular morphology, for example a spheroidal morphology, such that if d and D are respectively the minor and major axes of each of the particles, the D/d ratio can range from 1 to 1.5, preferably from 1 to 1.3. The mean diameter by mass of the particles of the solid product (B) can be from 5 to 200 μm, preferably from 10 to 100 μm, in particular from 20 to 80 μm. The morphology of the solid product (B) can advantageously be retained during the preparation of the solid catalytic component. The mean size of the solid catalytic component can be substantially identical to or greater than that of the solid product (B), owing to the formation of a polyolefin during the preparation of the solid catalytic component. The mean diameter by mass of the particles of the solid catalytic component can, for example, be from 1 to 3 times the mean diameter by mass of the particles of the solid product (B) used.

The process of the invention is particularly advantageous since it makes it possible to avoid the post-treatment stage of the solid catalytic component, that is to say the stage known under the term of "prepolymerization". It also makes it possible to prepare a Ziegler-Natta catalyst capable of manufacturing improved polyethylenes, such as homopolyethylenes (density=0.95 to 0.97) or in particular copolymers of ethylene with at least one other $C_3$ to $C_{12}$, preferably $C_3$ to $C_8$, olefin (density=0.90 to 0.95).

The process for the copolymerization of ethylene with at least one other olefin can be carried out either in suspension in an inert liquid hydrocarbon, such as one or more $C_4$ to $C_{10}$ alkanes, or in the gaseous phase in a reactor containing a mechanically stirred and/or fluidized bed, in the presence of the solid catalytic component prepared according to the invention and of a cocatalytic component, chosen from organometallic compounds of metals of Groups I to III of the Periodic Classification of the Elements, in particular alkylaluminiums, alkylzincs or alkylmagnesiums. The temperature of the copolymerization is less than the melting point of the copolymer manufactured; for example, it ranges from 20° to 110° C., preferably from 30° to 100° C. The total pressure can be from 0.1 to 5 MPa, preferably from 0.5 to 3 MPa.

The copolymers of ethylene thus prepared can have a density ranging from 0.88 to 0.94, preferably from 0.90 to 0.93. They have a macromolecular structure in which the comonomer units are distributed relatively homogeneously or statistically. The melting point of the copolymers can be in particular lower by at least 1° C. with respect to that of the copolymers prepared under the same conditions but with a solid catalytic component prepared without olefin. The melting point can be measured by a differential scanning calorimetric (DSC) analysis after annealing the copolymer at 200° C. for 20 minutes, cooling at the rate of 16° C. per minute to 50° C. and heating at the rate of 16° C. per minute. The copolymers may have a single melting point, ranging from 100° to 128° C. and depending on their density.

The copolymers can have a melt index ratio between 20 and 50, calculated by the ratio of the melt index ($MI_{21.6}$) measured under 21.6 kg to the melt index ($MI_{2.16}$) measured under 2.16 kg at 190° C. (ASTM-D-1238 Conditions F and E respectively).

The copolymers can have, moreover, a relatively narrow molecular mass distribution, such that the ratio of the weight-average molecular mass, Mw, to the number-average molecular mass, Mn, determined by gel permeation chromatography, is between 3 and 5.5 and more particularly between 4 and 5.

The relatively homogeneous nature of the distribution of the comonomer units of the copolymers of ethylene can be assessed by measuring the relative dispersity and the width of distribution of the branchings, carried out using $C_{13}$ NMR according to the methods and calculations given by:

Polymer Sequence Determination - Carbon-13 NMR Method, by J. C. Randall, edited by Academic Press, New York (1977), pages 72 to 75;

ACS Symposium Series No. 247 - NMR and Macromolecules - Sequence, Dynamic and Domain Structure, by J. C. Randall, edited by ACS, Washington DC (1984), pages 131 to 152;

Journal of Macromolecular Science, Reviews in Macromolecular Chemistry and Physics, Vol. C29 (No. 2 & 3), pages 201–317 (1989).

The following non-limiting examples illustrate the present invention.

EXAMPLE 1 a) Preparation of the solid product (B)

204 ml (1 mole) of isoamyl ether (IAE) are introduced, at room temperature (20° C.) and under a blanket of nitrogen, into a 5 liter, stainless steel reactor equipped with a stirrer system rotating at 325 revolutions to the minute and containing 2 moles of dibutylmagnesium in solution in 3 liters of n-hexane. The reactor is maintained at 25° C. 484 ml (4.4 moles) of tert-butyl chloride are introduced over 12 hours. The mixture is then kept stirring for 3 hours. The product obtained is washed several times with n-hexane. 2 moles of magnesium chloride, existing in the form of spherical particles having a mean diameter by mass Dm of 35 μm and containing 15 mol % of IAE, are thus obtained.

250 ml of n-hexane containing 0.2 mole of magnesium chloride prepared previously are introduced, under a nitrogen atmosphere, into a one liter glass reactor equipped with a stirrer system rotating at 400 revolutions to the minute. The suspension obtained is heated at 70° C. for one hour. The solid obtained is washed twice with 0.5 liter of n-hexane at 70° C. and then twice at 25° C. The suspension volume is brought back to 250 ml. 0.02 mole of triethyl orthoacetate, as a 370 millimoles per liter solution in n-hexane, is then introduced at 25° C. over 1 hour. After maintaining for 1 hour at 25° C., the solid obtained is washed 4 times at 25° C. with 0.5 liter of n-hexane. The suspension volume is then brought back to 250 ml. 0.2 mole of triethylaluminium, as reducing compound, is then introduced over 1 hour at 50° C. After maintaining for 1 hour at 50° C., the solid product (B) thus obtained is washed twice with 0.5 liter of n-hexane at 50° C. and twice with 0.5 liter of n-hexane at 25° C. The suspension volume is brought back to 250 ml by removing part of the clear phase. The solid product exists in the form of substantially spherical particles based essentially on magnesium dichloride, on triethyl orthoacetate and on triethylaluminium.

b) Preparation of the solid catalytic component

The suspension of the solid product (B) prepared previously is kept in the glass reactor which is heated to 50° C., is then degassed and finally ethylene is introduced therein until a partial pressure of 0.1 MPa relative is obtained. 50 ml of a mixture containing 20 millimoles of titanium tetrachloride and 20 millimoles of titanium tetra-n-propoxide in solution in n-hexane are then introduced into the reactor with stirring over 1 hour at 50° C., while maintaining an ethylene partial pressure of 0.1 MPa by addition of ethylene. The mixture is then maintained for 1 hour at 80° C. under 0.1 MPa of ethylene. The reactor is degassed, the solid catalytic component thus obtained is then washed four times at 80° C. with 0.5 liter of n-hexane on each occasion, and then four times at 25° C. with 0.5 liter of n-hexane on each occasion.

The solid catalytic component contains 3.0 g of polyethylene per millimole of titanium, as well as titanium and magnesium in a Ti/Mg=0.115/1 molar ratio, in the form of substantially spherical particles with a mean diameter by mass of 40 μm.

c) Copolymerization of ethylene with 4-methyl-1-pentene 1 liter of n-hexane, which is heated to 50° C., and then 2 millimoles of triethylaluminium, as cocatalytic component, and an amount of the solid catalytic component prepared previously corresponding to 0.1 millimole of titanium are introduced, under a nitrogen atmosphere, into a 2.16 liter stainless steel reactor equipped with a stirrer rotating at 500 revolutions to the minute. The temperature of the reactor is raised to 80° C.; 50 ml of 4-methyl-1-pentene and then 0.06 MPa of hydrogen and 0.24 MPa of ethylene are then introduced. The total pressure of the reactor is maintained constant at 0.4 MPa by the addition of ethylene until 170 g of copolymer are obtained over 15 minutes. The contents of the reactor are then collected. After addition of an amount of water into the suspension, the n-hexane is evaporated. The powder is then filtered, dried and then analysed as follows:

| | |
|---|---|
| Melt index (ASTM-D-1238 condition E): | 1.25 g/10 minutes |
| Density: | 0.933 |
| Melting temperature (DSC analysis): | 127.0° C. |
| % of extractibles with boiling n-hexane: | 4.8% by weight |

EXAMPLE 2 (COMPARATIVE)

The reaction is carried out exactly as in Example 1, except that, during the preparation of the solid catalytic component, the ethylene is not introduced before but only after the end of the introduction of the mixture of the titanium compounds, that is to say while the reaction mixture was being maintained for 1 hour at 80° C., the ethylene partial pressure being 0.1 MPa during this period.

The copolymer powder has a melting temperature (DSC) of 128.5° C., that is to say a temperature 1.5° C. greater than that of the copolymer of Example 1, for properties which are moreover substantially identical.

EXAMPLE 3 a) Preparation of the solid product (B)

2 l of n-hexane, 2.26 g of iodine, 31.9 g of magnesium metal, 1.1 ml of isobutanol, 6.4 ml of titanium tetra-n-propoxide and 2.5 ml of n-butyl chloride are successively introduced at 20° C., under a nitrogen atmosphere and with stirring, into a 5 liter stainless steel reactor equipped with a stirrer system and with a heating and cooling device. The reactor is heated to 85° C. and is maintained at this temperature for 15 minutes. At the end of this time, a solid product (B) in suspension in n-hexane is obtained, which is cooled to 80° C. The solid product (B) contains a Mg compound and has a reducing power for Ti compound.

b) Preparation of the solid catalytic component

Ethylene is introduced, into the suspension of the solid product (B) prepared previously and kept stirring at 80° C. in the reactor, until a partial pressure of 0.1 MPa is obtained. 18.3 ml of titanium tetrachloride and 39 ml of titanium tetra-n-propoxide are then introduced rapidly therein and then 213.6 ml of n-butyl chloride are slowly introduced therein over 4 hours, while maintaining an ethylene partial pressure of 0.1 MPa by addition of ethylene. At the end of this time, the reaction mixture thus obtained is maintained for 2 hours with stirring and at 80° C. under 0.1 MPa of ethylene and is then cooled to room temperature (20° C.) The solid catalytic component thus obtained is then washed three times with n-hexane. Analysis of the solid catalytic component shows that it contains, per millimole of titanium, 3.7 millimoles of magnesium, 7.7 millimoles of chlorine and 1 g of polyethylene.

EXAMPLE 4

Preparation of the Solid Catalytic Component

The suspension of the solid product (B) prepared in Example 1.a) in the glass reactor is heated to 25° C. The reactor is degassed and then ethylene and hydrogen are successively introduced therein until an ethylene partial pressure of 0.05 MPa and a hydrogen partial pressure of 0.05 MPa are obtained. 50 ml of a mixture of 20 millimoles of titanium tetrachloride and of 20 millimoles of titanium tetra-n-propoxide in solution in n-hexane are then slowly introduced into the reactor over 10 minutes with stirring at 25° C., while maintaining a total pressure of 0.1 MPa by addition of ethylene. At the end of this time, the reactor is heated to 80° C. and ethylene is added to maintain an ethylene partial pressure of 0.1 MPa for 1 hour. The reactor is degassed and the solid catalytic component thus obtained is washed four times at 80° C., each time with 0.5 l of n-hexane at 80° C.; then, after the reactor has been cooled to 20° C., the solid catalytic component is washed four times at 20° C., each time with 0.5 l of n-hexane at 20° C. The said catalytic component is maintained under a nitrogen atmosphere, ready to be used for an olefin polymerization.

The solid catalytic component contains 1.6 g of polyethylene per millimole of titanium, and titanium and magnesium in a Ti/Mg=0.115/1 molar ratio, in the form of substantially spherical particles having a mean diameter by mass of 38 μm substantially free of large and fine particles.

EXAMPLE 5

Preparation of the Solid Catalytic Component

The suspension of the solid product (B) prepared in Example 1.a) in the glass reactor is heated to 50° C. The reactor is then degassed, then ethylene is introduced therein until an ethylene partial pressure of 0.1 MPa is obtained and 15 ml of 4-methyl-1-pentene are also introduced therein. 50 ml of a mixture of 20 millimoles of titanium tetrachloride and 20 millimoles of titanium tetra-n-propoxide in solution in n-hexane are then slowly introduced into the reactor over 1 hour with stirring at 50° C., while maintaining an ethylene partial pressure of 0.1 MPa. At the end of this time, the reactor is heated to 80° C. and this temperature is maintained for 1 hour with an ethylene partial pressure of 0.1 MPa. The reactor is degassed and the solid catalytic component thus obtained is then washed as in Example 4.

The solid catalytic component contains 3 g of ethylene and 4-methyl-1-pentene copolymer per millimole of titanium, and titanium and magnesium in a Ti/Mg=0.1/1 molar ratio, in the form of substantially spherical particles having a mean diameter by mass of 39 μm.

EXAMPLE 6

Copolymerization of Ethylene with 1-Butene 700 g of an ethylene and 1-butene copolymer powder substantially identical to that to be produced (density= 0.9247 and melt index 0.44 g/10 minutes according to ASTM-D-1238 condition E) are introduced, under a nitrogen atmosphere, into a fluidized bed reactor with a diameter of 15 cm. The reactor is heated to 80° C. and the powder is purged with nitrogen and then with ethylene. Ethylene, 1-butene, hydrogen and nitrogen are then introduced into the reactor at 80° C. to form, under a total pressure of 1 MPa, a gaseous composition containing, by volume:

```
35.9% ethylene,
13.2% 1-butene,
8.6% hydrogen, and
42.3% nitrogen.
```

An amount of the solid catalytic component prepared in Example 4, containing 0.28 millimole of titanium, and 3.55 millimoles of triethylaluminium, as cocatalytic component, are then introduced into the reactor. The copolymerization takes place for 3 hours with an ascensional velocity of the gaseous composition of 21 cm/s, under a total pressure of 1 MPa maintained by the addition of ethylene. 3140 g of powder comprising 2440 g of copolymer produced by the reaction are recovered. The copolymer powder has the following characteristics:

```
melt index: 0.48 g/10 minutes (ASTM-D-1238 condition E),
density: 0.9255
melting temperature (DSC analysis): 122.7° C.
mean diameter by mass of the particles: 715 μm
substantially spherical particles (D/d ≦ 1.3).
```

By way of comparison, a solid catalytic component is prepared as in Example 4, with the exception of the fact that the ethylene and the hydrogen were not introduced before but after the addition of the titanium compounds. It gives a copolymer powder, in the conditions of Example 6, having a melting temperature (DSC analysis) of 123.7° C., ie a temperature 1° C. greater than that of the copolymer prepared according to the invention.

EXAMPLE 7 a) Preparation of the solid product (B)

Microspheroidal silica powder sold uner the tradename "ES 70"® by Joseph Crosfield and Sons (Great Britain) is subjected for 12 hours to a heat treatment at 870° C. in a reactor containing a fluidized bed through which a stream of dry nitrogen is passed. After the heat treatment the dried silica powder obtained is cooled to a temperature of about 20° C. and is kept under a nitrogen atmosphere.

20 kg of predried silica and n-hexane in order to obtain 110 liters of suspension are introduced at ambient temperature into a 240-liter stainless steel reactor fitted with a stirring device rotating at 166 revolutions per minute, followed, at a temperature of 50° C., by 16 mols of hexamethyldisilazane. The suspension thus obtained is kept stirred at 80° C. for 4 hours. It contains a solid which is washed five times with 130 liters of n-hexane at 50° C.

30 mols of dibutylmagnesium are next introduced into the reactor at a temperature of 50° C. and over 2 hours. The suspension obtained is kept stirred at 50° C. for 1 hour. It contains a solid product containing 1.5 millimole of magnesium per gram of silica.

The reactor containing the solid product in suspension in n-hexane is next heated to 50° C. and 60 mols of tertbutyl chloride are introduced into the reactor over 2 hours. At the end of this time the suspension obtained is stirred at 50° C. for 1 hour. It contains a solid product, which is washed three times with 130 liters of n-hexane at 50° C.

The reactor is next heated to 50° C. and 6.0 moles of triethyl orthoacetate are introduced rapidly into it. The suspension obtained is kept stirred at 50° C. for 1 hour.

12 mols of trimethylaluminium are next introduced into the reactor at 50° C. The suspension obtained is kept stirred at 80° C. for 2 hours. The reactor is cooled to 20° C., and a solid product (B) in suspension in n-hexane is obtained, containing a Mg compound and having a reducing power for Ti compound.

b) Preparation of the solid catalytic component

The suspension of the solid product (B) prepared previously is stirred and heated to 50° C. Ethylene and hydrogen are introduced into the reactor, until an ethylene partial pressure of 0.05 MPa and a hydrogen partial pressure of 0.05 MPa are obtained. Into the reactor 3.0 mols of titanium tetra-n-butoxide and 3.0 mols of titanium tetrachloride are introduced over 1 hour, while maintaining a total pressure of 0.1 MPa by addition of ethylene. At the end of this time, the reactor is heated to 80° C. and ethylene is added to maintain an ethylene partial pressure of 0.1 MPa for 2 hours. The suspension thus obtained is cooled to 20° C. and contains the solid catalytic component, ready to be used for an ethylene copolymerization, after being washed five times with 130 liters of n-hexane at 20° C.

I claim:

1. A process for the preparation of an olefin polymerization solid catalyst composition comprising at least one transition metal, a magnesium compound and a halogen, which process comprises either:

(i) sequentially first contacting an olefin with a solid product (B) containing a magnesium compound substantially free of any transition metal compound, said magnesium compound being capable of reducing a transition metal compound (A), and thereafter contacting the products resulting from step (i) with at least one compound (A) of a transition metal at its maximum valency of Group IV, V or VI of the Periodic Classification of the Elements in liquid form under conditions such that the olefin at least partially polymerizes; or (ii) simultaneously contacting an olefin with a solid product (B) containing a magnesium compound substantially free from any transition metal compound, said magnesium compound being capable of reducing a transition metal compound (A), and with at least one compound (A) of a transition metal at its maximum valency of Group IV, V or VI of the Periodic Classification of the Elements in liquid form, under conditions such that the olefin at least partially polymerizes during the said simultaneous contacting.

2. Process according to claim 1, characterized in that the compound (A) corresponds to the formula $$M(OR)_n X_{m-n}$$

in which M is titanium, vanadium or chromium, X is chlorine, bromine or iodine, R is a $C_1$ to $C_{14}$ aromatic, cycloalkyl or alkyl radical, or the group COR' with R' being a $C_1$ to $C_{14}$ aromatic, cycloalkyl or alkyl radical, "m" corresponds to the valency of the transition metal and "n" is an integer or fractional number less than or equal to "m".

3. Process according to claim 1, characterized in that the magnesium compound is magnesium metal or a compound of formula $MgR_n X_{2-n}$ in which X is chlorine, bromine or iodine, R is a $C_1$ to $C_{14}$ aromatic, cycloalkyl or alkyl radical or a group OR' with R' being a $C_1$ to $C_{12}$ aromatic, cylcoalkyl or alkyl radical, and "n" is an integer or fractional number ranging from 0 to 2.

4. Process according to claim 1, characterized in that the solid product (B) capable of reducing the transition metal comprises an organometallic compound of a metal of Groups I to III of the Periodic Classification of the Elements, which is either (i) an alkylaluminium of formula $AlR_n X_{3-n}$ in which X is chlorine, bromine, iodine, hydrogen or a group OR' with R' being a $C_1$ to $C_{12}$ aromatic, cycloalkyl or alkyl radical, R is a $C_1$ to $C_{12}$ aromatic, cycloalkyl or alkyl radical and "n" an integer or fractional number ranging from 1 to 3, or (ii) an alkylmagnesium of formula $MgR_m X_{2-m}$ in which R and X have the same definition as previously and "m" is an integer or fractional number ranging from 1 to 2.

5. Process according to claim 1, characterized in that the olefin is one or more olefins chosen from $C_2$ to $C_{12}$ olefins.

6. Process according to claim 1, characterized in that the amount of olefin used is such that the solid catalyst composition contains from 0.01 to 100 g of polyolefin per millimole of transition metal.

7. Process according to claim 1, characterized in that the contacting is carried out in the presence of hydrogen.

8. Process according to claim 1, characterized in that, during the bringing into contact, the pressure of the olefin is from 1 to $10^3$ kPa and the temperature from 0° to 120° C.

9. A process according to claim 1 wherein the contacting is carried out in a liquid inert medium.

10. A process according to claim 9 wherein the liquid inert medium is a liquid hydrocarbon selected from the group consisting of alkanes and cycloalkanes.

11. A process according to claim 9 wherein the compound (A) of the transition metal is miscible or soluble in the liquid inert medium used for contacting.

12. The process of claim 1 wherein the sequential procedure (i) is carried out.

13. The process of claim 1 wherein the simultaneous procedure (ii) is carried out.

14. A process according to claim 1, in which the solid product (B) also comprises a refractory oxide.

* * * * *